E. R. GILL.
PACKING MEANS FOR PRESERVING PERISHABLE ARTICLES.
APPLICATION FILED JULY 1, 1913.
1,139,359.
Patented May 11, 1915.
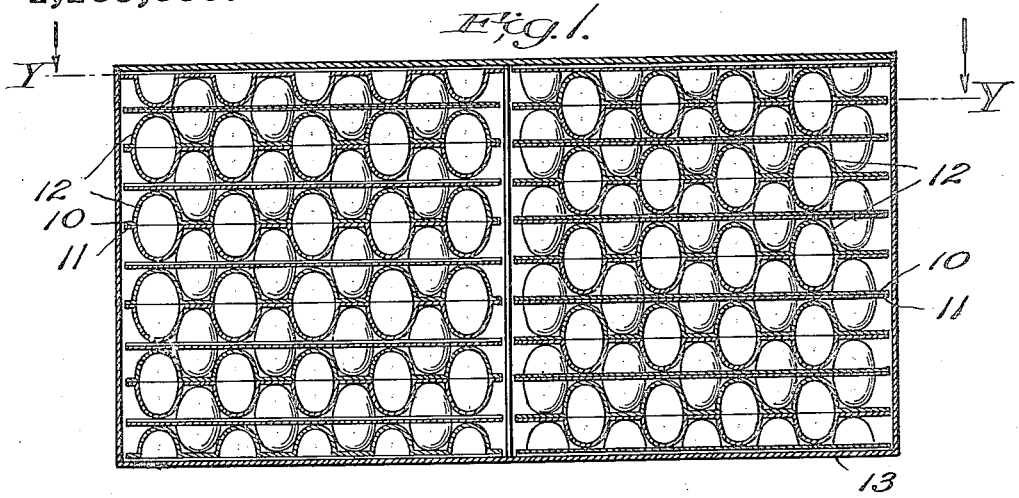
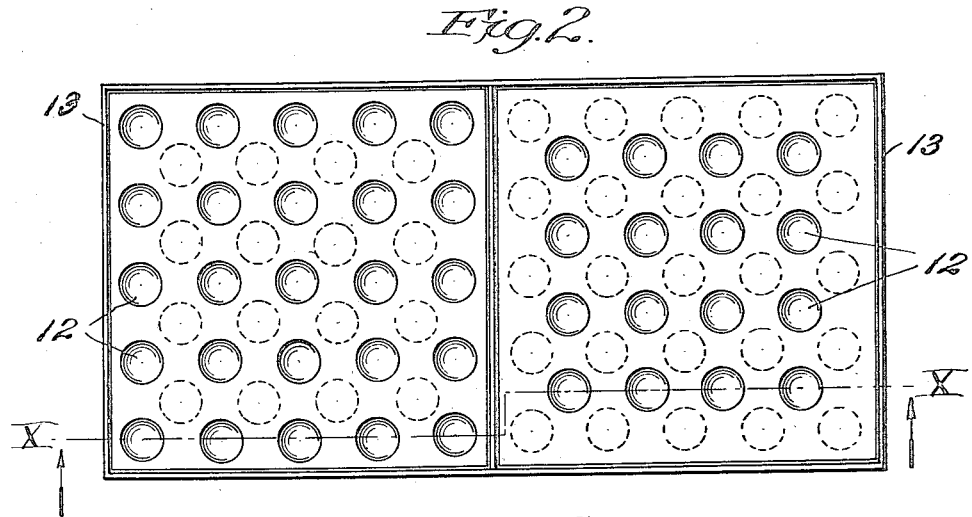
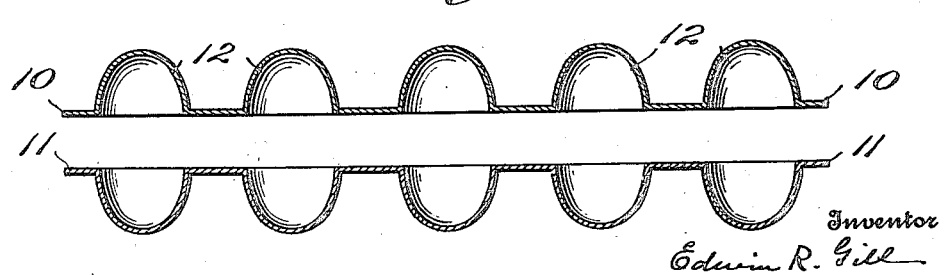

UNITED STATES PATENT OFFICE.

EDWIN R. GILL, OF YONKERS, NEW YORK.

PACKING MEANS FOR PRESERVING PERISHABLE ARTICLES.

1,139,359.

Specification of Letters Patent.     Patented May 11, 1915.

Application filed July 1, 1913.   Serial No. 776,773.

*To all whom it may concern:*

Be it known that I, EDWIN R. GILL, a citizen of the United States, residing at Yonkers, in the county of Westchester and State of New York, have invented certain new and useful Improvements in Packing Means for Preserving Perishable Articles; and I do hereby declare the following to be a full, clear, and exact description of the invention, such as will enable others skilled in the art to which it appertains to make and use the same.

In transporting and storing eggs, fruit and the like, it has been customary to make use of containers and wrappers of various kinds which, while affording more or less protection from bruising or breakage, nevertheless are not effective in excluding microbes, ferments and other microscopic agents of destruction. Indeed certain wrappers have been employed, as, for instance, containers made of strawboard, which often carry within them such undesirable germs as are found on the straw, etc., of which they are made. These germs, being communicated to the contents of the packages, become a source of rot or taint. Prior methods have also been practised in packing eggs, wherein each egg was coated or closely wrapped or both with antiseptic envelops which acted to stop up the pores in the shells, and deprived the egg of air, besides tending to cause detriment to the egg by direct action of the foreign material upon the contents of the shell.

The object of the present invention is the provision of an improved container whereby, not only are all the atmospheric germs prevented from gaining access to the contents during transportation, but tainting by contact with the envelop itself is prevented, a body of air is inclosed around each egg, and the original, unchanged, natural condition of the egg is maintained.

A preferred form of envelop or container, especially useful for the safe transportation and storage of eggs and certain fruits, is illustrated in the accompanying drawing, wherein—

Figure 1 is a vertical section of an egg crate packed with my improved containers taken on the line *x—x* of Fig. 2, Fig. 2 is a horizontal section of the same on the line Y—Y of Fig. 1, and Fig. 3 is a sectional view of a small container showing the two halves separated.

It is to be understood, of course, that the form illustrated is set forth merely by way of example, as my invention is applicable to a great variety of forms of container.

The egg or fruit case shown in the drawings consists of two halves or sheets 10 and 11, as clearly shown in Fig. 3, each of which is formed with domes or pockets, 12. The entire finished container is formed by bringing two of these sheets together so that the opening of each dome or pocket in each sheet registers with the similar opening in the other sheet. Unit containers are thus formed which may be used separately or be packed together.

My invention consists in manufacturing these or other suitable containers of pulp impregnated with a suitable antiseptic or germicide. Impregnation in this manner makes it possible to use straw-board or other material otherwise frequently a source of germ taint.

I prefer to incorporate the germicide in question in the original pulp vat from which the material is taken, although this is not essential.

While a great variety of germicides will answer the purpose, I prefer such as least tend to impart any odor or flavor to the contents of the package, and I have found a strong proportion of common salt (NaCl) to be particularly adapted to this purpose.

In Figs. 1 and 2 are shown the special packing usually employed by me for shipping and storing eggs. The crates 13 are made in two divisions adapted to hold fifteen dozen in each. In order to accommodate this number in crates of this character, alternate horizontal packing units are used having respectively sixteen and twenty five cells, as shown on the two sides of Fig. 2. This arrangement causes the cells in each unit to occupy the spaces between the cells in the next unit, thus economizing space and making the strength and elasticity of the dome form available to resist breakage throughout the entire volume of the crate.

My method of packing reduces to a minimum any tendency to imparting the odor or flavor of the germicide to the contained eggs, etc., since contact between the article contained and its envelop is restricted to a relatively small area. In this respect my method is superior to coating each egg, wrapping in paper or merely packing in lime, etc.

What I claim is—

1. In a packing means for the purpose described, a closed cell having walls composed of pulp impregnated with a germicide.

2. In a packing means for the purpose described, a closed cell having walls composed of pulp impregnated with a germicide and shaped loosely to envelop the article to be packed, substantially as described.

3. In a packing means for the purpose described, a pair of sheets each provided with half cells adapted to register with the half cells in the other, the walls of said half cells being impregnated with an antiseptic material, substantially as described.

In testimony whereof, I affix my signature, in presence of two witnesses.

EDWIN R. GILL.

Witnesses:
H. S. MACKAYE,
KATHARINE C. MEAD.